No. 794,851. PATENTED JULY 18, 1905.
W. H. CAMPBELL.
TYPE WRITING MACHINE.
APPLICATION FILED SEPT. 22, 1904.

7 SHEETS—SHEET 1.

Witnesses

Inventor
W. Hope Campbell
by H. B. Willson
Attorney

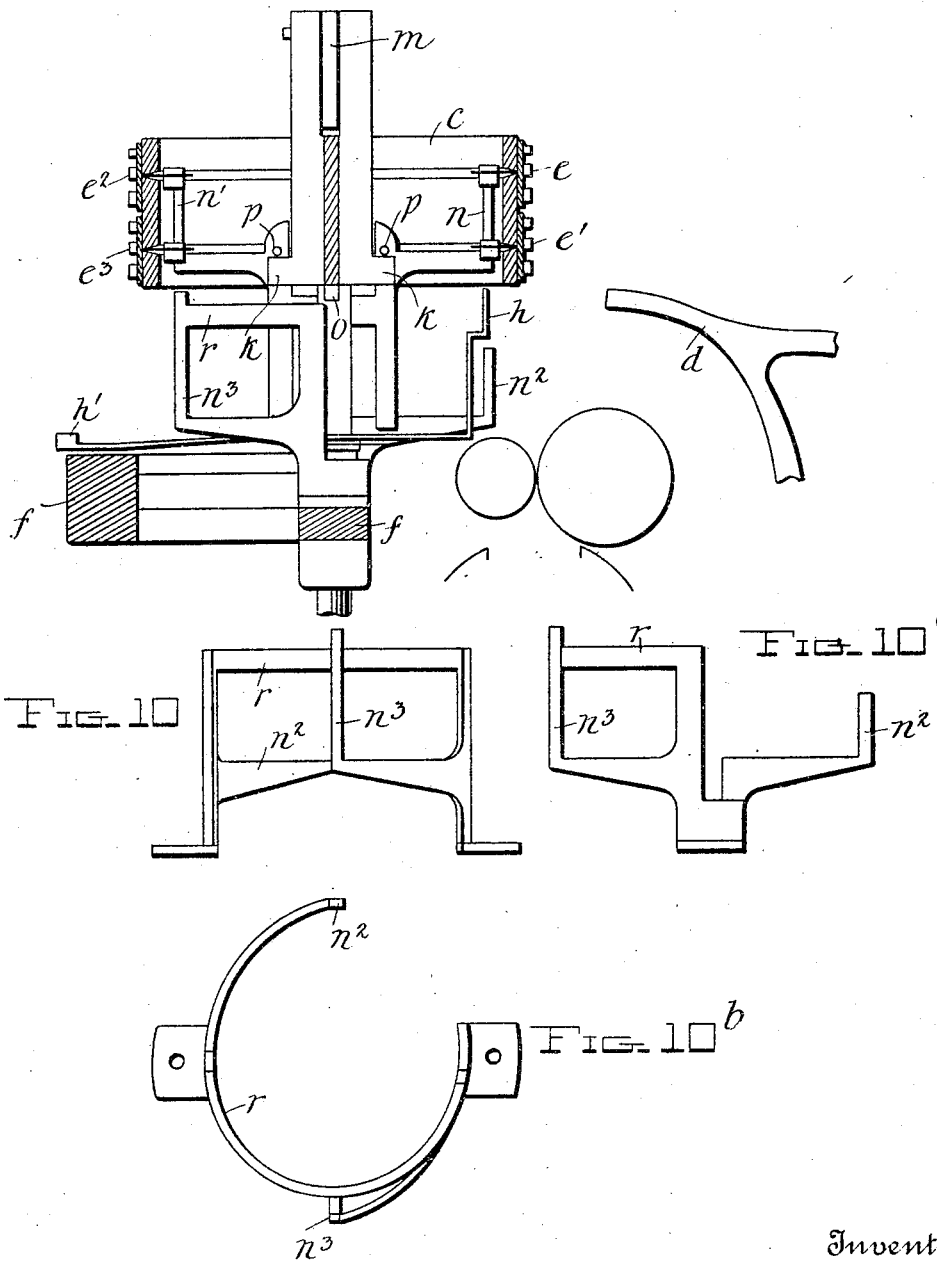

No. 794,851. PATENTED JULY 18, 1905.
W. H. CAMPBELL.
TYPE WRITING MACHINE.
APPLICATION FILED SEPT. 22, 1904.
7 SHEETS—SHEET 3.
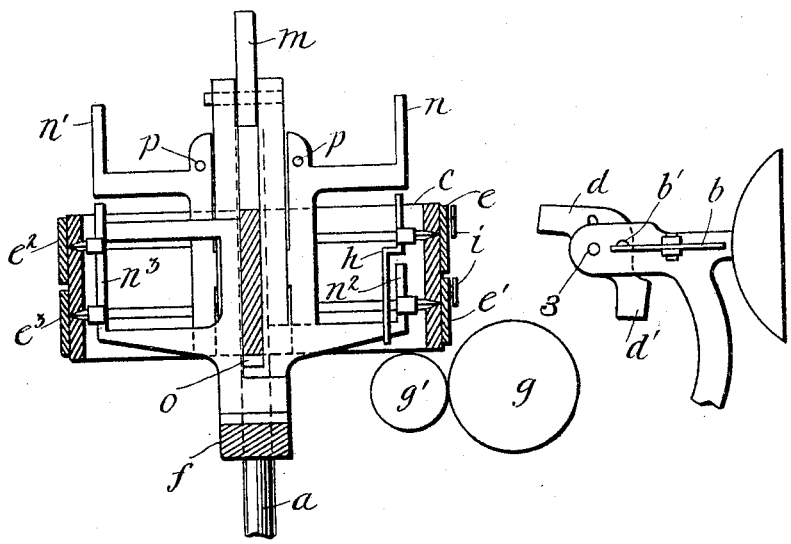
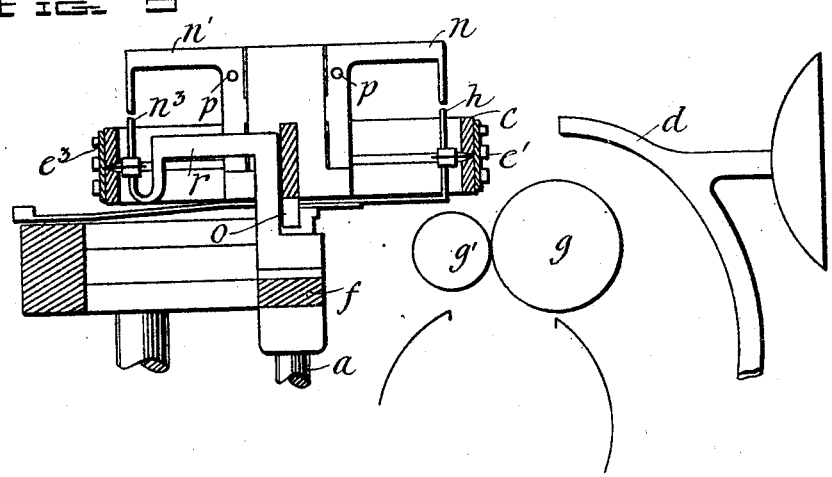
Witnesses
Inventor
W. Hope Campbell No. 794,851. PATENTED JULY 18, 1905.
W. H. CAMPBELL.
TYPE WRITING MACHINE.
APPLICATION FILED SEPT. 22, 1904.
7 SHEETS—SHEET 4.
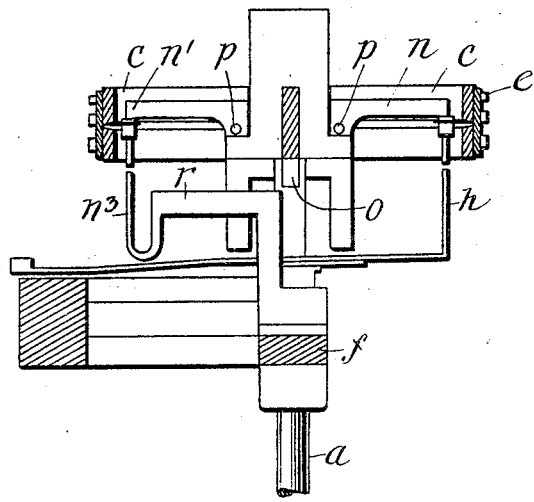
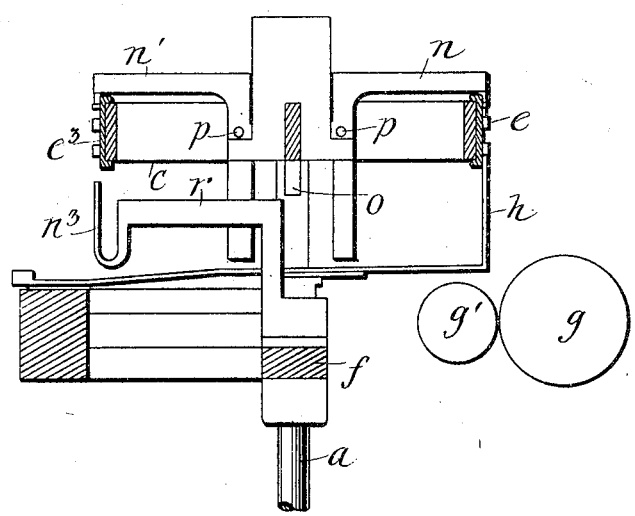

No. 794,851. PATENTED JULY 18, 1905.
W. H. CAMPBELL.
TYPE WRITING MACHINE.
APPLICATION FILED SEPT. 22, 1904.
7 SHEETS—SHEET 5.
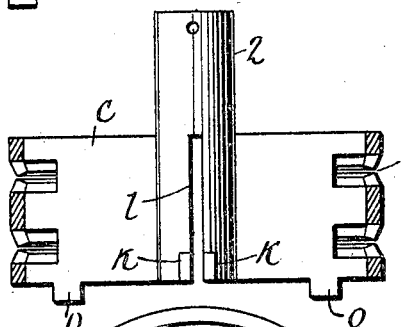
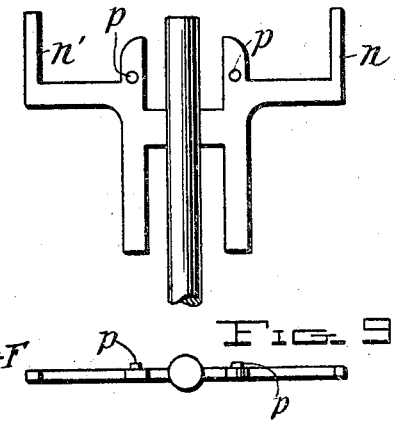
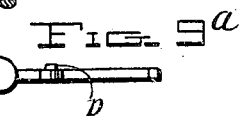
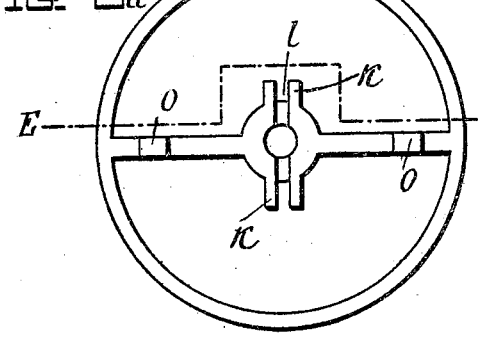
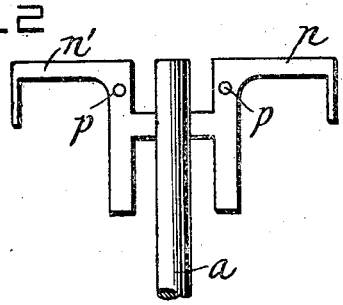
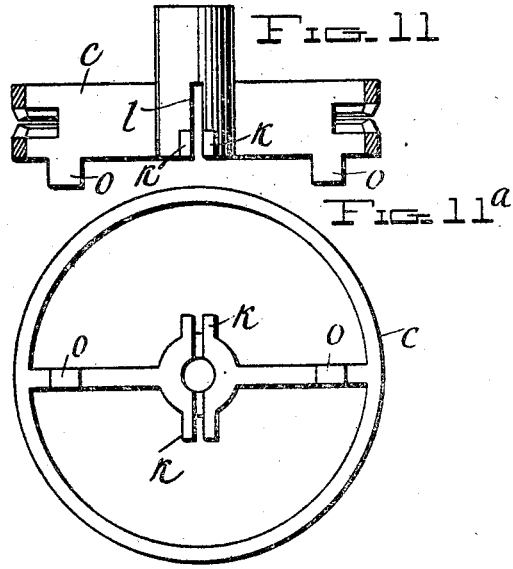
Witnesses
Inventor
W. Hope Campbell
by H. R. Willson
Attorney

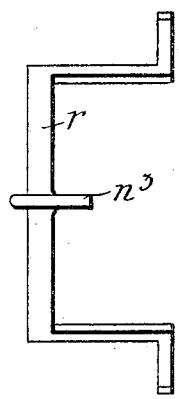
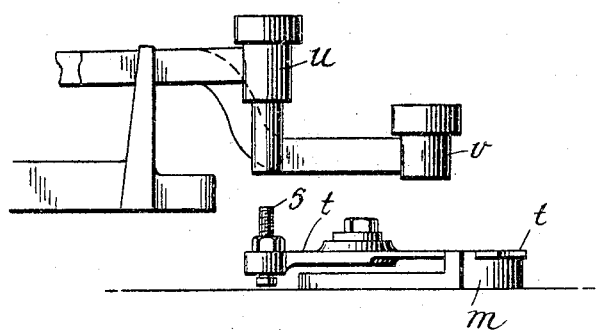
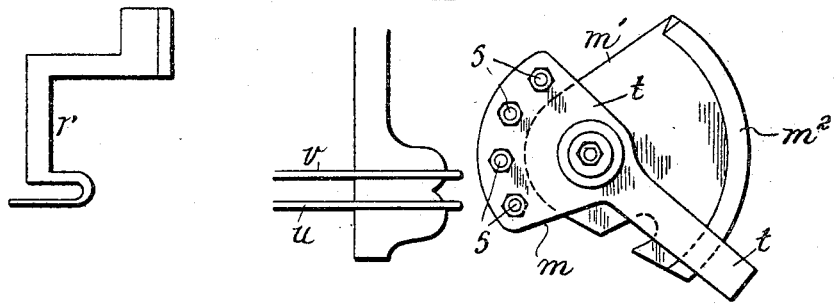

No. 794,851. PATENTED JULY 18, 1905.
W. H. CAMPBELL.
TYPE WRITING MACHINE.
APPLICATION FILED SEPT. 22, 1904.
7 SHEETS—SHEET 7.
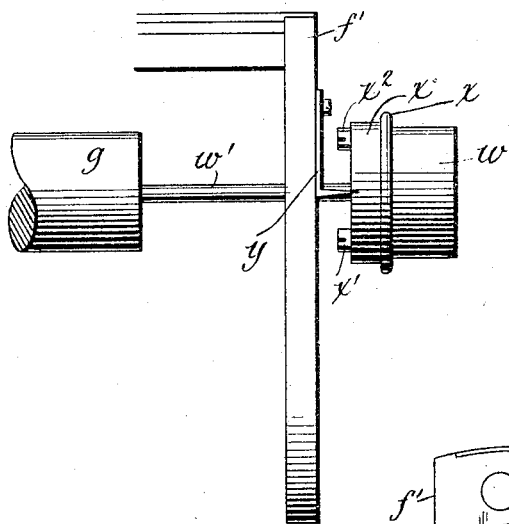
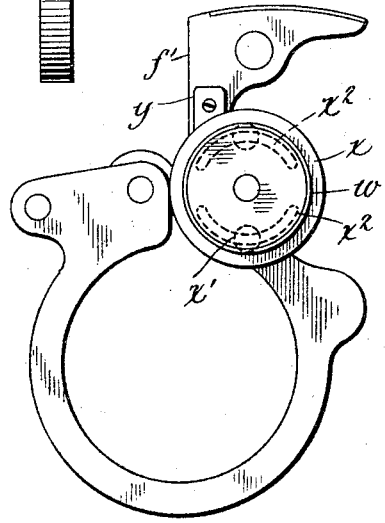
Witnesses
Inventor
W. Hope Campbell
by H. B. Wilson
Attorney No. 794,851. Patented July 18, 1905.

UNITED STATES PATENT OFFICE.

WALTER HOPE CAMPBELL, OF KIEFF, RUSSIA.

TYPE-WRITING MACHINE.

SPECIFICATION forming part of Letters Patent No. 794,851, dated July 18, 1905.

Application filed September 22, 1904. Serial No. 225,624.

*To all whom it may concern:*

Be it known that I, WALTER HOPE CAMPBELL, a subject of His Britannic Majesty, residing at Kieff, Russia, have invented certain new and useful Improvements in Type-Writing Machines; and I do hereby declare the following to be a full, clear, and exact description of the invention, such as will enable others skilled in the art to which it appertains to make and use the same.

This invention relates to type-writers, and more particularly to that class of machines having two or more type shuttles or segments adapted to be interchangeably brought into operative position for use.

My improvements are more particularly designed for attachment to the Hammond type of machine, but may, with slight alterations, be adapted for use with machines of various characters.

One of the objects of the invention is to provide simple and reliable means for causing the shuttles to assume their proper positions when changed.

Another object is to provide means for writing superior and inferior characters, such as are found necessary in mathematical and chemical formulæ; and still another object is to provide improved means for writing in different colors whenever desired by the operator.

These and other objects are attained by means of the construction illustrated in the accompanying drawings, in which—

Figure 1:
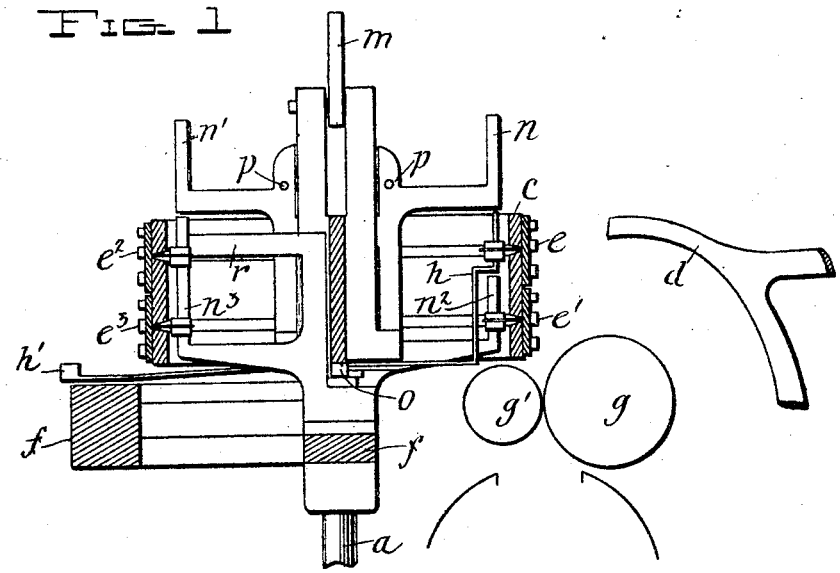
Figure 2:
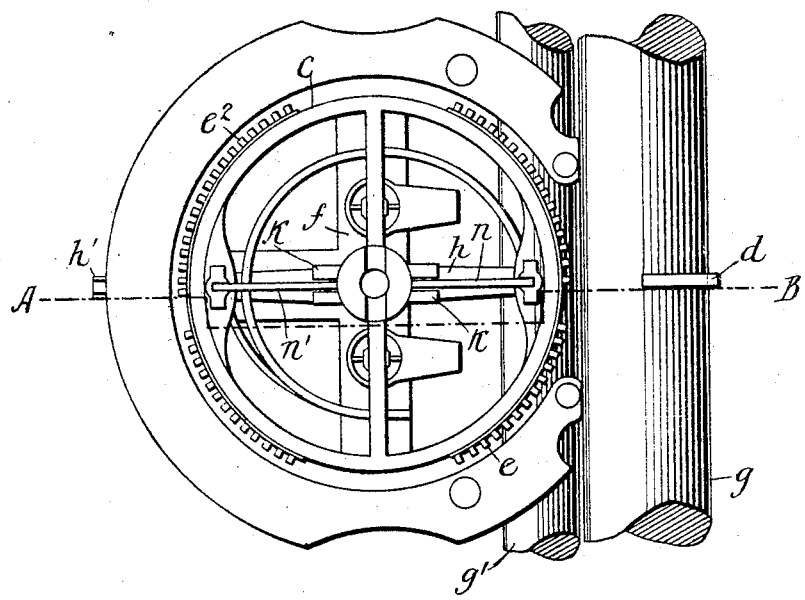

Figure 1 is a vertical section on the line A B of Fig. 2 of the parts of a type-writing machine embodying my improvements and showing the anvil in its lowermost position for ordinary writing. Fig. 2 is a plan view of the same with the paper-rollers broken away at their opposite ends. Fig. 3 is a vertical section similar to Fig. 1 with the anvil in its uppermost position. Fig. 4 is a vertical section of parts of a machine embodying my improvements in a four-shuttle machine designed for writing in different colors. Fig. 5 is a similar view of parts of a machine embodying my improvements in machines of the single-shuttle type with the anvil in its lowermost position. Fig. 6 is a like view of the same with the anvil in its uppermost position. Fig. 7 is a vertical section of the same in which the driving-arm is shown extended to engage the shuttle outside the anvil. Fig. 8 is a vertical section of the anvil for four-shuttle machines on line E F, Fig. 8$^a$. Fig. 8$^a$ is an under side plan view of the same. Fig. 9 is a detail side elevation of the spindle and spindle-horns of a machine of the character illustrated in Fig. 1. Fig. 9$^a$ is a plan view of the same. Fig. 10 is a front elevation of the turn-table. Fig. 10$^a$ is a side elevation of the same. Fig. 10$^b$ is a plan view of the same. Fig. 11 is a vertical section of an anvil designed for use with a single-shuttle machine. Fig. 11$^a$ is an under side plan view of the same. Fig. 12 is a detail side elevation of the spindle and horns of a single-shuttle machine. Fig. 12$^a$ is a plan view of the same. Fig. 13 is a front elevation of the turn-table and turn-table horn designed for use with a single-shuttle machine. Fig. 13$^a$ is a side elevation of the same. Fig. 14 is a detail side elevation of the stroke-regulator for the shift-keys of the anvil. Fig. 15 is a plan view of the same. Fig. 16 is a front elevation of the vertical spacing device for writing the superior and inferior characters above and below the line, and Fig. 17 is a side elevation of the same.

As shown in the accompanying drawings, my improvements are particularly adapted for use with machines of the Hammond type or those having oscillatory or rotary type-segments movable around an anvil and adapted to receive the blow of a hammer for printing a letter.

Referring to the drawings for a more detailed description of my invention, and more particularly to Figs. 1 to 16, inclusive, the letter $a$ denotes the spindle upon which the anvil is mounted and around which the shuttles and type-segments are adapted to oscillate or rotate, and $c$ is the anvil, provided with segmental grooves 1, a central sleeve 2, provided with a slot $l$ and lugs $k$ and $o$, as shown in Figs. 8 and 8$^a$. The purpose of the slot $l$ and the lugs $k$ $o$ is to permit the shuttles to slide vertically and to lock the anvil in place. The hammer $d$ may be of the usual construction, but when used with certain phases of my improvements may be modified, as shown in Fig. 4, in which the hammer-head $d\ d'$ is pivoted to the hammer at 3 and provided with a spring-detent $b$, having a pin $b'$ for holding the hammer-head in either of its positions to bring into use one or the other of the hammer-heads $d$ or $d'$, as will be understood. The shuttles $e\ e'\ e^2\ e^3$ are fitted to slide in the grooves 1 of the anvil $c$. Part of the frame of the machine is indicated at $f$, and $g\ g'$ are the feed-rollers for the paper, while $h$ is the driving-arm and $h'$ the stop-arm. The ink-ribbons are indicated at $i$ in Fig. 4. In the four-shuttle type of machine an eccentric or equivalent device $m$ is utilized for raising and lowering the anvil. The upper spindle-horns $n\ n'$, Fig. 9, are connected to the spindle $a$ by means of integral arms $l^2$, and stop-pins $p$ project outward from the bars of the spindle-horn frame to limit the upward movement of the anvil $c$. The lower spindle-horns $n^2\ n^3$ are formed upon a curved skeleton frame provided with a turn-table rim $r$, as shown in Figs. 10, $10^a$, and $10^b$. The purpose of this construction is to permit an extended vertical movement of the anvil and to rotate the shuttle from an arm or rim $r$ nearly in horizontal line with said shuttle.

The operation of the four-shuttle machine may be described as follows: To raise the anvil $c$ from the position shown in Fig. 1 to the position shown in Fig. 3, the anvil may be grasped and moved upward on the spindle $a$ until it is stopped by the pins $p\ p$, when it is rotated on the turn-table rim $r$ until it drops off the latter. When the anvil is thus raised, the horns $n\ n'$ engage all the four shuttles and prevent their being displaced during the rotation of the anvil. When the anvil drops, the horns $n^2\ n^3$ engage three of the shuttles, while the driving-arm $h$ engages the fourth shuttle, which latter is then ready for writing. The two-shuttle machine is operated in a similar manner. It will be understood that in machines in which only a single row of shuttles is used it will not be necessary to raise or lower the anvil on the spindle, and therefore the eccentric $m$ may be dispensed with in this type of machine, as is indicated in Figs. 5, 6, 7, 11, $11^a$, 12, $12^a$, 13, and $13^a$ of the drawings.

The construction shown in Figs. 14 and 15 may be utilized for printing superior and inferior characters above and below the text-line. The sector $m'$ is provided with a rim $m^2$, having a series of notches for holding a lever $t$ in adjusted position. This lever has a series of regulating-screws $s$ passing through it, said adjusting-screws being adapted to be swung under the anvil-shifting keys $u\ v$ to limit the stroke and the consequent movement of the anvil to print characters above and below or on the text-line. In the use of this device it will be understood that after the stroke of the key has been regulated by the adjustment of the lever $t$ said lever is then moved to the corresponding notch in the rim $m^2$ before printing the character.

In Figs. 16 and 17, $g$ is the paper-roll. $f$ is part of the framework of the machine. $w'$ is the shaft of the paper-roll, which is journaled in the frame and is provided at its outer end with the usual finger-wheel $w$. Between the frame $f$ and the wheel $w$ on the shaft $w'$ is an index-wheel $x$, having a graduated scale thereon, and a pointer $y$ is secured to the frame and extends over the scale. Screws $x'\ x'$ extend through curved slots $x^2\ x^2$ in the index-wheel $x$ and are connected to the finger-wheel $w$, thus permitting the free movement of the index-wheel to move the paper vertically to print at an equal distance above or below the text-line in writing chemical and mathematical formulæ. The operation of this mechanism may be described as follows: In printing fractions the index-wheel $x$ is rotated until the finger $y$ points to "0" on the scale, and the dividing-line of the fraction is then printed. The carriage is then back-spaced one step, and the paper is depressed until the pointer indicates the correct distance on the scale and the numerator is printed. The carriage is again back-spaced and the paper raised to the correct height on the scale and the denominator is printed. The paper is again depressed until the finger $y$ points to "0," when the ordinary text-writing may be continued.

As shown in Fig. 4, the ribbons $i\ i$ are arranged one above the other and may be of different colors. In connection with this arrangement of parts a double-headed hammer is a very desirable adjunct, since one of the heads may be swung into position for operation on one of the ribbons and the other head may be utilized for the other ribbon, thus affording a double point of impact and permitting the printing of two colors with a slight adjustment of the hammer-head.

From the foregoing it will be obvious that my improvements may be utilized with type-writing machines of various types with comparatively slight changes in the structure of the parts.

Various changes in the form, proportion, and the minor details of construction may be resorted to without departing from the principle or sacrificing any of the advantages of this invention.

Having thus described my invention, what I desire to secure by Letters Patent and claim is—

1. In a type-writing machine, a spindle, an anvil mounted thereon, type-shuttles carried by the anvil, horns carried by the spindle, a turn-table, horns fixed to the turn-table, both sets of horns adapted to engage the shuttles to guide them in vertical adjustment, and a driving-arm adapted to engage one of the shuttles, substantially as described.

2. In a type-writing machine, a spindle, an anvil, a plurality of type-shuttles, a plurality of ink-ribbons, and a double-headed hammer, pivoted to the hammer-bar and held in adjusted position by a spring, substantially as described.

3. In a type-writing machine, a spindle, an anvil, a plurality of type-shuttles, horns carried by the spindle and the frame of the machine to afford accurate vertical movement of the anvil and shuttles, two ink-ribbons and a hammer, substantially as described.

4. In a type-writing machine, a spindle, an anvil, a plurality of type-shuttles, shift-keys for the anvil, a sector, a lever pivoted thereto, and a series of regulating-screws passing through the lever, substantially as described.

In testimony whereof I affix my signature in presence of two witnesses.

WALTER HOPE CAMPBELL.

Witnesses:
FREDERIC C. DEL STROTHER,
ADAM QURE.